US009438409B1

United States Patent
Liao et al.

(10) Patent No.: US 9,438,409 B1
(45) Date of Patent: Sep. 6, 2016

(54) CENTERING BAUD-RATE CDR SAMPLING PHASE IN A RECEIVER

(71) Applicant: Xilinx, Inc., San Jose, CA (US)

(72) Inventors: Yu Liao, Longmont, CO (US); Geoffrey Zhang, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/789,738

(22) Filed: Jul. 1, 2015

(51) Int. Cl.
*H03H 7/30* (2006.01)
*H04L 7/00* (2006.01)
*H04L 7/04* (2006.01)
*H04L 25/03* (2006.01)

(52) U.S. Cl.
CPC ........... *H04L 7/0016* (2013.01); *H04L 7/0062* (2013.01); *H04L 7/048* (2013.01); *H04L 25/03057* (2013.01)

(58) Field of Classification Search
CPC ................... H04L 25/0307; H04L 25/03159; H04L 7/033; H04L 25/03885
USPC ................................ 375/233, 229, 230, 232
See application file for complete search history.

(56) References Cited

U.S. PATENT DOCUMENTS

| 7,440,497 | B2 * | 10/2008 | Balan | ................ | H04L 25/03343 |
| | | | | | 375/229 |
| 8,005,418 | B2 * | 8/2011 | Walker et al. | ............... | 455/3.02 |
| 8,649,476 | B2 * | 2/2014 | Malipatil et al. | ............. | 375/355 |
| 8,654,830 | B1 * | 2/2014 | Lin et al. | ....................... | 375/233 |
| 2003/0235145 | A1 * | 12/2003 | Shanbhag | ............... | H04J 14/02 |
| | | | | | 370/201 |
| 2006/0256849 | A1 * | 11/2006 | Tseng | .................. | H04L 25/0307 |
| | | | | | 375/232 |
| 2010/0238993 | A1 * | 9/2010 | Huang | .................. | H04L 7/0337 |
| | | | | | 375/233 |
| 2012/0033685 | A1 * | 2/2012 | Doblar et al. | ................. | 370/535 |
| 2014/0169438 | A1 * | 6/2014 | Lin | ....................... | H04L 7/0025 |
| | | | | | 375/232 |

* cited by examiner

*Primary Examiner* — Helene Tayong
(74) *Attorney, Agent, or Firm* — Robert M. Brush

(57) ABSTRACT

In an example, an apparatus for clock data recovery (CDR) includes a data slicer operable to generate data samples derived from a transmitted signal, and an error slicer operable to generate error samples derived from a transmitted signal. The apparatus further includes a CDR circuit operable to generate sampling clock phase for the data slicer and the error slicer from output of the data samples and the error samples. The apparatus further includes a decision adapt circuit operable to set a decision threshold of the error slicer, wherein for each main-cursor data sample of the data samples the decision adapt circuit is operable to adjust the decision threshold based on a function of at least one pre-cursor data sample, at least one post-cursor data sample, or a combination of at least one pre-cursor data sample and at least one post-cursor data sample.

17 Claims, 4 Drawing Sheets

CENTERING BAUD-RATE CDR SAMPLING PHASE IN A RECEIVER

TECHNICAL FIELD

Examples of the present disclosure generally relate to electronic circuits and, in particular, to centering baud-rate clock data recovery (CDR) phase in a receiver.

BACKGROUND

Clock data recovery (CDR) is an important block in a receiver system for high-speed serial communications. The CDR block generates the correct sampling clock phase for data recovery. The quality of the high-speed serial communication link can be sensitive to the sampling dock phase, especially in the presence of jitter and noise.

One type of existing CDR is an edge-sampled CDR. An edge-sampled CDR oversamples the analog input waveform to generate the correct data sampling dock and recover the transmitted data. The edge-sampled CDR assumes the data to be sampled at around the center between zero-crossing points. The resulting oversampled system consumes more clocking power than a system operating at the symbol rate (also referred to as baud-rate).

SUMMARY

Techniques for providing baud-rate clock data recovery (CDR) are described. In an example, an apparatus for clock data recovery (CDR) includes a data slicer operable to generate data samples derived from a transmitted signal, and an error slicer operable to generate error samples derived from a transmitted signal. The apparatus further includes a CDR circuit operable to generate sampling clock phase for the data slicer and the error slicer from output of the data samples and the error samples. The apparatus further includes a decision adapt circuit operable to set a decision threshold of the error slicer, wherein for each main-cursor data sample of the data samples the decision adapt circuit is operable to adjust the decision threshold based on a function of at least one pre-cursor data sample, at least one post-cursor data sample, or a combination of at least one pre-cursor data sample and at least one post-cursor data sample In another example, a receiver includes a front end operable to receive from a transmitted signal from a channel, a data slicer operable to generate data samples from output of the front end, and an error slicer operable to generate error samples from the output of the front end. The receiver further includes a CDR circuit operable to generate sampling clock phase for the data slicer and the error slicer from output of the data samples and the error samples. The receiver further includes a decision adapt circuit operable to set a decision threshold of the error slicer, wherein for each main-cursor data sample of the data samples the decision adapt circuit is operable to adjust the decision threshold based on a function of at least one pre-cursor data sample, at least one post-cursor data sample, or a combination of at least one pre-cursor data sample and at least one post-cursor data sample In another example, a method of clock data recovery (CDR) for a receiver includes generating, at a baud-rate, data samples derived from a received signal using a data slicer; generating, at a baud-rate, error samples derived from the received signal using an error slicer; generating a sampling clock phase for the data slicer and error slicer from the data samples and the error samples; and setting a decision threshold of the error slicer for each main-cursor data sample of the data samples by adjusting the decision threshold based on a function of at least one pre-cursor data sample, at least one post-cursor data sample, or a combination of at least one pre-cursor data sample and at least one post-cursor data sample.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
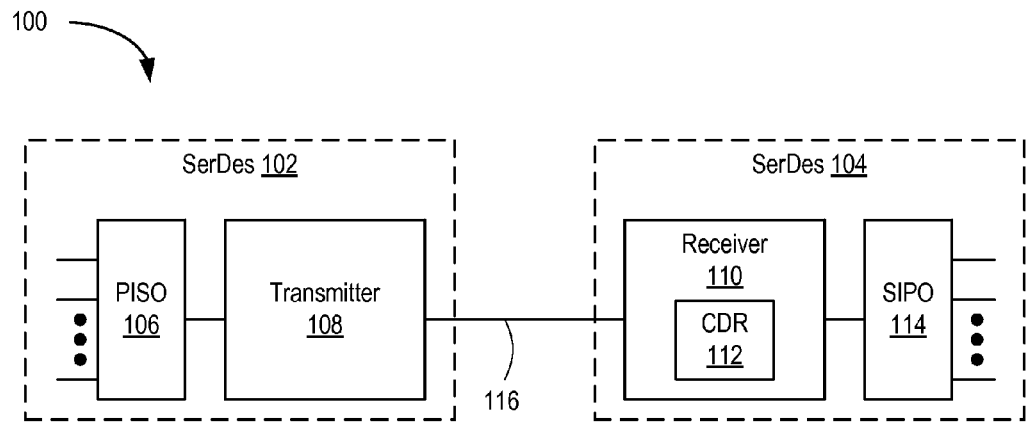
FIG. 1 is a block diagram depicting an example communication system.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated, or if not so explicitly described.

FIG. 1 is a block diagram depicting an example communication system 100. The communication system 100 comprises a transmitter 108 coupled to a receiver 110 via a channel 116. In an example, the transmitter 108 is a part of a serializer/deserializer (SerDes) 102, and the receiver 110 is part of a SerDes 104. For clarity, the deserialization circuitry is omitted from the SerDes 102, and the serialization circuitry is omitted from the SerDes 104. The SerDes 102 includes a parallel-in-serial-out (PISO) circuit 106 that converts parallel input data to serial output data for transmission over the channel 116 by the transmitter 108. The SerDes 104 includes a serial-in-parallel-out (SIPO) circuit that converts serial data output by the receiver 110 to parallel output data.

The SerDes 102 and the SerDes 104 can include other circuitry (not shown), such as decoders, encoders, and the like.

While the SerDes 102 and the SerDes 104 are shown, in other examples, each of the transmitter 108 and/or the receiver 110 can be a stand-alone circuit not being part of a larger transceiver circuit. In some examples, the transmitter and the receiver 110 can be part of one or more integrated circuits (ICs), such as application specific integrated circuits (ASICs) or programmable ICs, such as field programmable gate arrays (FPGAs).

The channel 116 can include an electrical or optical transmission medium. An electrical transmission medium can be any type of electrical path between the transmitter 108 and the receiver 110, which can include metal traces, vias, cables, connectors, decoupling capacitors, termination resistors, and the like. The electrical transmission medium can be a differential signal path. An optical transmission medium can be any type of optical path between the transmitter 108 and the receiver 110, which can include any kind of optical modules.

In an example, the transmitter 108 transmits serialized data over the channel 116 using a digital baseband modulation, such as a binary non-return-to-zero (NRZ) modulation, multilevel pulse amplitude modulation (PAM-n), or the like. In NRZ modulation, each transmitted symbol comprises one bit. In multilevel PAM, each symbol comprises multiple bits. For example 4-level PAM (PAM4) includes four levels and can be used to transmit two-bit symbols. In general, the transmitter 108 transmits the serialized data as a sequence of symbols using a particular modulation scheme. There are two possible values for each symbol in NRZ modulation, and there are n possible values for each symbol in PAM-n modulation. The rate at which the transmitter 108 transmits the symbols is referred to as the symbol-rate or baud-rate.

The transmitter 108 does not transmit a reference clock with the data. Rather, the receiver 110 includes a clock data recovery (CDR) circuit 112 (or CDR 112) for extracting a clock from the incoming symbol stream. The extracted clock is sequentially used to sample the incoming symbol stream and recover the transmitted bits. As described herein, the CDR circuit 112 operates at the baud-rate, rather than oversampling the incoming symbol stream. As such, the CDR circuit 112 conserves power compared to oversampling CDR circuits. Further, the CDR circuit 112 can achieve optimal or near optimal sampling phase even as the channel loss profile changes.

Figure 2:
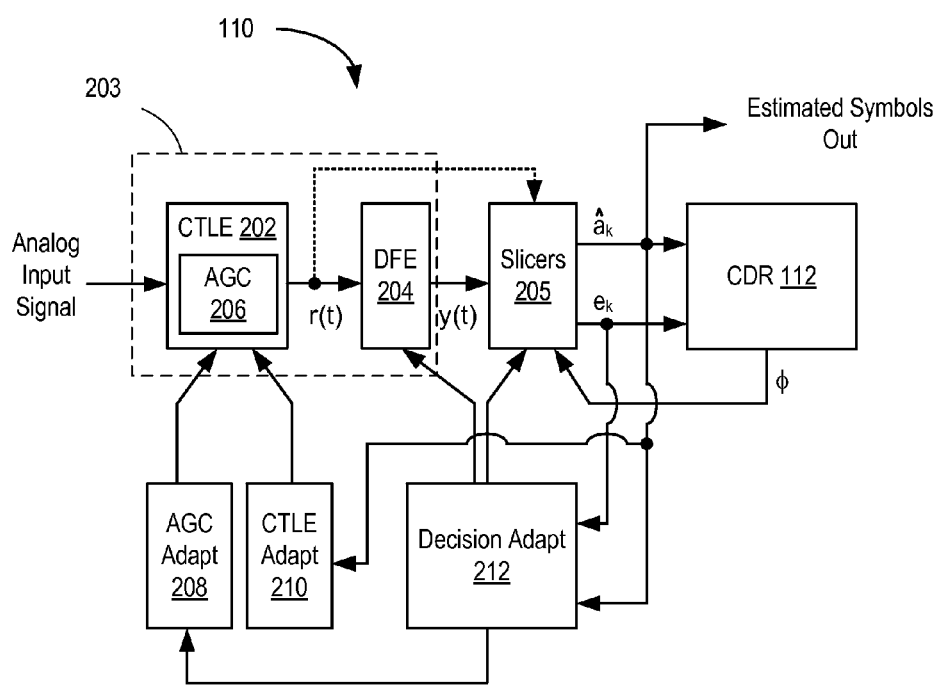
FIG. 2 is a block diagram depicting an example of receiver.

FIG. 2 is a block diagram depicting an example of the receiver 110. The receiver 110 includes a continuous time linear equalizer (CTLE) 202, a decision feedback equalizer (DFE) 204, slicers 205, the CDR 112, an automatic gain control (AGC) adapt circuit 208, a CTLE adapt circuit 210, and a decision adapt circuit 212. The CTLE 202 can include an AGC circuit 206. The CTLE 202 and DFE 204 can be part of a front end 203 of the receiver 110.

The CTLE 202 is coupled to receive an analog input signal from the channel 116. The channel 116 degrades the signal quality of the transmitted analog signal. Channel insertion loss is the frequency-dependent degradation in signal power of the analog signal. When signals travel through a transmission line, the high frequency components of the analog signal are attenuated more than the low frequency components. In general, channel insertion loss increases as frequency increases. Signal pulse energy in the analog signal can be spread from one symbol period to another during propagation on the channel 116. The resulting distortion is known as inter-symbol interference (ISI). In general, ISI becomes worse as the speed of the communication system increases.

The CTLE 202 operates as a high-pass filter or band-pass filter to compensate for the low-pass characteristics of the channel 116. The peak of the frequency response of the CTLE 202 can be adjusted by the CTLE adapt circuit 210. The AGC circuit 206 controls the gain of the high-pass filter. The gain of the AGC circuit 206 can be controlled by the AGC adapt circuit 208. The CTLE 202 outputs an equalized analog signal. While the CTLE 202 having the AGC circuit 206 is shown, in other examples, the receiver 110 can include other types of continuous-time filters with or without amplification. Thus, in general, the receiver 110 filters the analog signal received from the channel 116 to generate a "filtered analog signal" using some type of continuous-time filter with or without amplification, such as the CTLE 202 shown in FIG. 2. The filtered analog signal is also referred to herein as r(t), where t denotes time.

The DFE 204 is coupled to the CTLE 202 and receives the filtered analog signal. The DFE 204 is operable to equalize the filtered analog signal to compensate for post-cursor ISI. The DFE 204 can include one or more analog filters as known in the art. The DFE 204 can receive a control signal from the decision adapt circuit 212. The DFE 204 generates an "equalized analog signal," which is also referred to as y(t), where t denotes time.

The slicers 205 sample the equalized analog signal to generate a data sample ($\hat{a}_k$) and an error sample ($e_k$) per symbol (k). Each of the slicers 205 samples its analog input signal using a sampling clock at the baud-rate (symbol rate) to generate the data and error samples. In asynchronous systems, the CDR 112 is locked to the incoming signal. The data samples comprise estimated values for the symbols, and the error samples comprise estimated decision errors for the symbols. As described below, the slicers 205 can include separate data and error samplers. In some examples, the CDR 112 operates in accordance with a minimum mean squared error (MMSE) algorithm. In such examples, both the data and error samplers receive the equalized analog signal y(t). In other examples, the CDR 112 operates in accordance with a Mueller-Muller algorithm. In such examples, the data sampler can operate on the equalized analog signal y(t), the error sampler can operate on the filtered analog signal r(t). The CDR 112 controls the sampling phase of the slicers 205. The decision adapt circuit 212 controls the decision thresholds of the slicers 205.

The CDR 112 is coupled to the slicers 205 and receives the data and error samples. The CDR 112 generates a sampling phase value ($\phi$) per symbol based on the data and error samples. The CDR 112 generates a control signal for adapting the sampling phase of the slicers 205 based on generated timing error values. The CDR 112 can operate using various algorithms, such as an MMSE algorithm or a Mueller-Muller algorithm.

The decision adapt circuit 212 is coupled to the DFE 204 and the slicers 205 and receives the data and error samples. The decision adapt circuit 212 generates a control signal to control the decision threshold(s) of the slicers 205 based on the data and error samples. The decision adapt circuit 212 also generates cursor-weights (h) for pre-cursor(s), main cursor, and post-cursor(s) for each processed symbol, but the error samples used to adapt these weights may come from error slicers that are different from the error slicers that are used for timing error generation of CDR.

The CTLE adapt circuit 210 is coupled to the DFE 204 to receive the data samples. The CTLE adapt circuit 210 generates a control signal to adjust the peak frequency response of the CTLE 202. The AGC adapt circuit 208 is coupled to the decision adapt circuit 212 to receive the main cursor magnitude signal ($h_0$). The AGC adapt circuit 208 generates a control signal to adjust the gain of the AGC 206 circuit.

Figure 3:
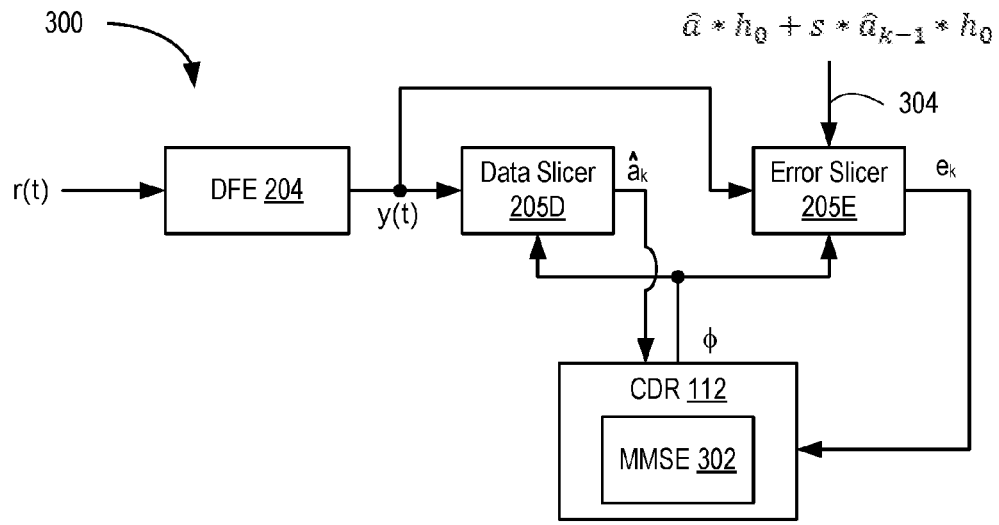
FIG. 3 is a block diagram depicting a baud-rate clock data recovery (CDR) system according to an example.

FIG. 3 is a block diagram depicting a baud-rate CDR system 300 according to an example. The baud-rate CDR system 300 includes the DFE 204, a data slicer 205D, an error slicer 205E, and the CDR 112. The CDR 112 includes an MMSE module 302. An input of the DFE 204 receives the filtered analog signal r(t). An output of the DFE 204, y(t), is coupled to an input of the data slicer 205D, and to an input of the error slicer 205E. An output of the data slicer 205D provides symbol decisions $â_k$. The output of the data slicer 205D is coupled to an input of the CDR 112. An output of the error slicer 205E provides the error samples $e_k$. The output of the error slicer 205E is coupled to an input of the CDR 112. The CDR 112 generates a control signal $\phi$ to control the sampling phase of the data slicer 205D and the error slicer 205E. An output of the CDR 112 provides the sampling phase $\phi$, which is coupled to inputs of the data slicer 205D and the error slicer 205E, respectively. A threshold input 304 of the error slicer 205E receives a signal to set the decision threshold thereof. The signal coupled to the threshold input 304 is discussed below. The MMSE module 302 performs an MMSE algorithm to determine the sampling phase.

Baud-rate CDR techniques use a baud-rate clock source, which saves considerable power. Without compensation, however, the sampling phase is not guaranteed to be the center of the eye, resulting in compromised jitter tolerance. Moreover, when operating on output of a DFE, the resulting sampling phase can be considerably off the center of the data eye, which causes degraded bit error rate (BER) performance or even an unstable system.

Normally, Mueller-Muller CDRs converge to a sampling phase that is not centered in the data eye if the waveform (e.g., the combined result of the channel characteristics and the transmitted signal attributes) is not symmetric. MMSE CDRs attempt to minimize the mean squared errors at the DFE output, where most post cursor ISI is removed, while considerable pre-cursor ISI remains. Thus, to minimize the equalization error, an MMSE CDR generates a sampling phase that converges to a phase such that the pre-cursor ISI is minimized. Since most post-cursor ISI is removed by the DFE, the residual post-cursor ISI has little effect on the final sampling phase based on the MMSE algorithm. As a result, the converged sampling phase leans towards the direction that minimizes the pre-cursor ISI.

Accordingly, the CDR system 300 implements an offset baud-rate CDR that adds a configurable amount of pre-cursor and post-cursor ISI into the timing error computation to control and center the sampling phase for the slicers. The offset baud-rate CDR improves the jitter tolerance and the BER performance.

Conventional MMSE CDR drives the sampling phase such that the mean squared error is minimized. The mean squared error can be defined as:

$$E[err(\phi)^2] = E[(y(kT+\phi) - â'_k)^2] \quad (1),$$

where k is an integer, T is the symbol period, $â'_k = â'_k * h_0$, and $h_0$ is the ideal amplitude scale for the main cursor. Let $y_k = y(kT+\phi)$, the conventional MMSE CDR computes the error as $e_k = sgn(y_k - â_k * h_0)$. Simplified MMSE timing error is given by:

$$e(\phi) = sgn(e_{k-1}) * [sgn(â_k - â_{k-2})] \quad (2).$$

In the CDR system 300, a configurable amount of post-cursor and/or precursor ISI is introduced, when computing the error $err(\phi) = y(kT+\phi) - â_k * h_0$ in Equation (1). Rather than being computed by $e_k = sgn(y_k - â_k * h_0)$, the error samples can be computed by:

$$e_k = sgn[y_k - â_k * h_0 + f(â_{k-1}, â_{k+1})] \quad (3),$$

where $f$ is a function of the k−1 (first post-cursor data sample) and k+1 (first pre-cursor data sample) symbol decisions. While the function $\theta(â_{k-1}, â_{k+1})$ in Equation (3) involves only the first post-cursor and precursor data samples, in general the function can involve more post-cursor and precursor data samples. In one example, the error samples can be computed by:

$$e_k = sgn[y_k - â_k * h_0 + s * (â_{k-1}) * h_0] \quad (4),$$

where s is a programmable scalar value. That is, in this example, $f = s * (â_{k-1}) * h_0$. In another example, $f = s * (â_{k+1}) * h_0$. The value of s can be selected to add a configurable amount of post-cursor ISI to the timing error calculation. In another example, the function is $\Sigma_{i \neq 0} w_i * â_{k-i}$, where $w_i$ is the weight put on data sample $â_{k-i}$. That is, the function can be a weighted sum of the at least one pre-cursor data sample, the at least one post-cursor data sample, or the combination of the at least one pre-cursor data sample and the at least one post-cursor data sample.

The threshold input 304 to the error slicer 205E can be provided by the decision adapt circuit 212. As such, the decision adapt circuit 212 can compute the function $f$ and its value per symbol. In an example, $f = s * (â_{k-1}) * h_0$. The decision adapt circuit 212 can determine a value for s upon initialization of the receiver 110. The value of s can be determined by measuring the characteristics of the channel.

Figure 4:
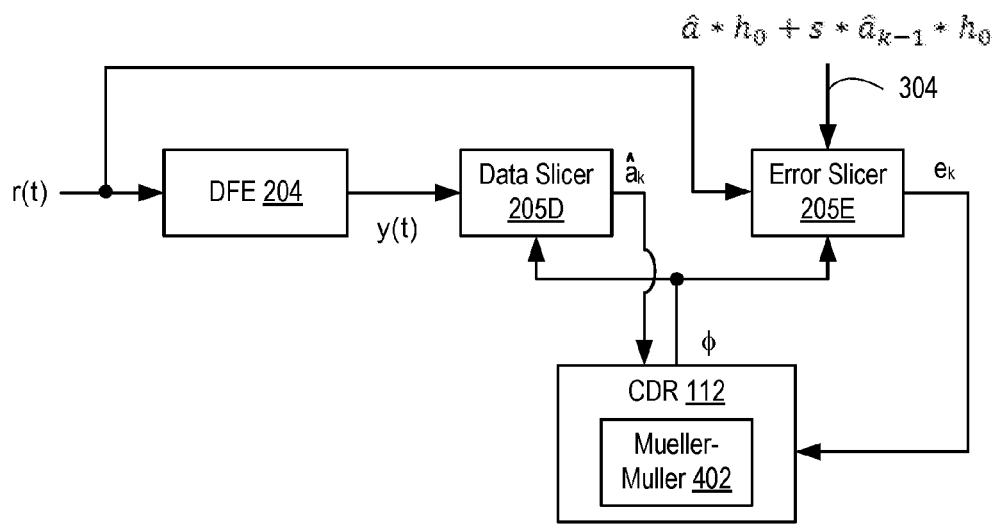
FIG. 4 is a block diagram depicting a baud-rate CDR system 300 according to another example.

FIG. 4 is a block diagram depicting a baud-rate CDR system 400 according to another example. The baud-rate CDR system 400 includes the DFE 204, the data slicer 205D, the error slicer 205E, and the CDR 112. An input of the DFE 204 receives the filtered analog signal r(t). An output of the DFE 204, y(t), is coupled to an input of the data slicer 205D. An input of the error slicer 205E is coupled to receive the filtered analog signal, r(t). An output of the data slicer 205D provides data symbol decisions $â_k$. The output of the data slicer 205D is coupled to an input of the CDR 112. An output of the error slicer 205E provides the error decisions $e_k$. The output of the error slicer 205E is coupled to an input of the CDR 112.

The CDR 112 includes a Mueller-Muller module 402. The Mueller-Muller module 402 computes the timing error as $e(\phi) = sgn(r_k) * sgn(e_{k-1}) - sgn(r_{k-1}) * sgn(e_k)$, where $r_k = r(kT+\phi)$, and $e_k = sgn(r_k - â_k * h_0 + f(â_{k-1}, â_{k+1}))$, while the conventional Mueller-Muller CDR computes $e_k = sgn(r_k - â_k * h_0)$. The CDR 112 converges to a phase such that $E[e(\phi)] = 0 \rightarrow h_1(\phi) = h_{-1}(\phi)$, where $h_1(\phi)$ and $h_{-1}(\phi)$ are the corresponding $1^{st}$ post-cursor and precursor ISI coefficients, respectively, at the CTLE/AGC output.

The CDR 112 generates a control signal to control the sampling phase of the data slicer 205D and the error slicer 205E. An output of the CDR 112 provides the control signal, which is coupled to inputs of the data slicer 205D and the error slicer 205E, respectively. A threshold input 304 of the error slicer 205E receives a signal to set the decision threshold thereof. The signal coupled to the threshold input 304 can be computed as described above with respect to FIG. 3.

Figure 5:
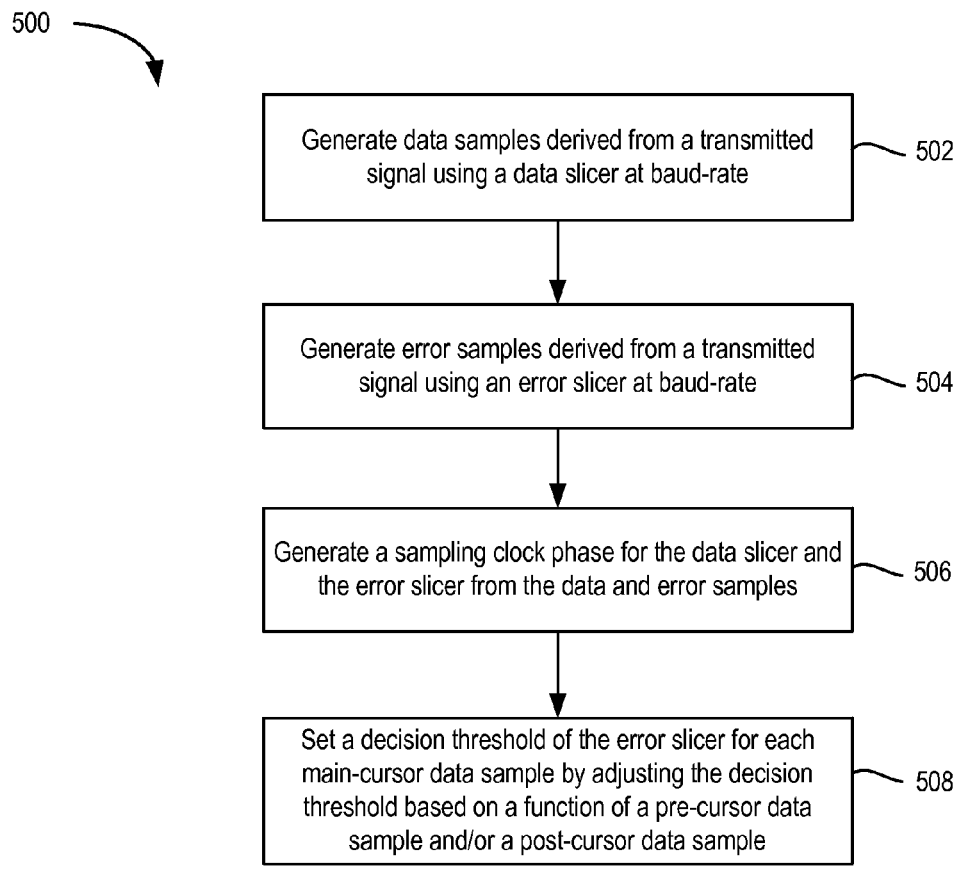
FIG. 5 is a flow diagram depicting an example of a method of clock data recovery in a receiver.

FIG. 5 is a flow diagram depicting an example of a method 500 of clock data recovery in a receiver. The method 500 begins at step 502, where the data slicer 205D generates data samples at baud-rate derived from a transmitted signal. In an example, the data samples are derived from output of a DFE. At step 504, the error slicer 205E generates error samples at baud-rate derived from a transmitted signal. In an example, the error samples are derived from output of a DFE. In another example, the error samples are derived from input to a DFE, such as from output of a CTLE.

At step 506, a CDR circuit 112 generates a sampling clock phase for the data slicer 205D and the error slicer 205E from the data and error samples. At step 508, a decision adapt circuit 212 sets a decision threshold of the error slicer 205E for each main-cursor data sample by adjusting the decision threshold based on a function of pre-cursor data sample(s) and/or post-cursor data sample(s).

Figure 6:
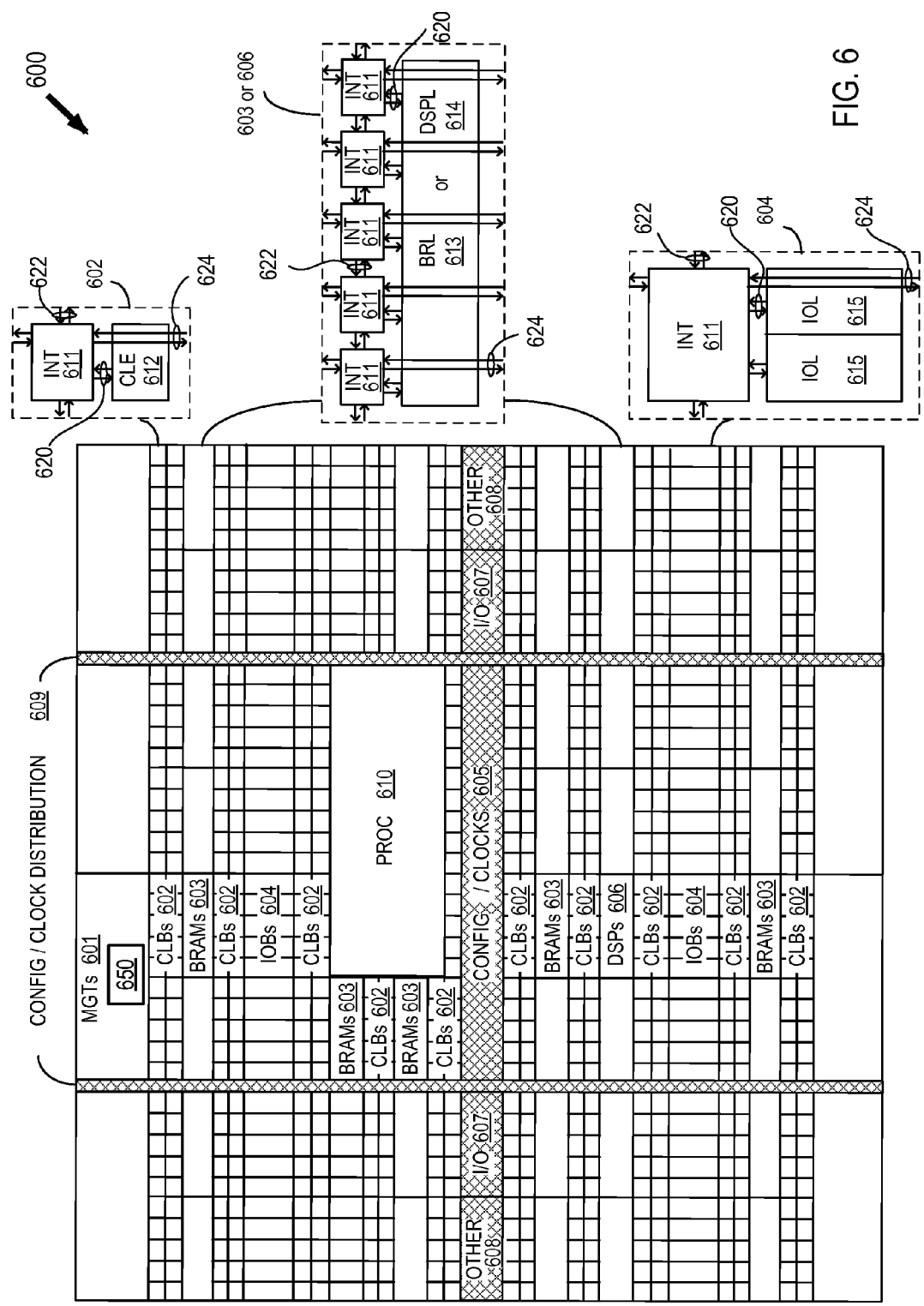
FIG. 6 illustrates an architecture of a field programmable gate array (FPGA) in which example CDR systems described herein can be used.

The CDR systems described herein can be used in serial receivers or transceivers disposed in an IC, such as an FPGA. FIG. 6 illustrates an FPGA architecture 600 that includes a large number of different programmable tiles including multi-gigabit transceivers ("MGTs") 601, configurable logic blocks ("CLBs") 602, random access memory blocks ("BRAMs") 603, input/output blocks ("IOBs") 604, configuration and clocking logic ("CONFIG/CLOCKS") 605, digital signal processing blocks ("DSPs") 606, specialized input/output blocks ("I/O") 607 (e.g., configuration ports and clock ports), and other programmable logic 608 such as digital clock managers, analog-to-digital converters, system monitoring logic, and so forth. Some FPGAs also include dedicated processor blocks ("PROC") 610.

In some FPGAs, each programmable tile can include at least one programmable interconnect element ("INT") 611 having connections to input and output terminals 620 of a programmable logic element within the same tile, as shown by examples included at the top of FIG. 6. Each programmable interconnect element 611 can also include connections to interconnect segments 622 of adjacent programmable interconnect element(s) in the same tile or other tile(s). Each programmable interconnect element 611 can also include connections to interconnect segments 624 of general routing resources between logic blocks (not shown). The general routing resources can include routing channels between logic blocks (not shown) comprising tracks of interconnect segments (e.g., interconnect segments 624) and switch blocks (not shown) for connecting interconnect segments. The interconnect segments of the general routing resources (e.g., interconnect segments 624) can span one or more logic blocks. The programmable interconnect elements 611 taken together with the general routing resources implement a programmable interconnect structure ("programmable interconnect") for the illustrated FPGA.

In an example implementation, a CLB 602 can include a configurable logic element ("CLE") 612 that can be programmed to implement user logic plus a single programmable interconnect element ("INT") 611. A BRAM 603 can include a BRAM logic element ("BRL") 613 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 606 can include a DSP logic element ("DSPL") 614 in addition to an appropriate number of programmable interconnect elements. An 10B 604 can include, for example, two instances of an input/output logic element ("IOL") 615 in addition to one instance of the programmable interconnect element 611. As will be clear to those of skill in the art, the actual I/O pads connected, for example, to the I/O logic element 615 typically are not confined to the area of the input/output logic element 615.

In the pictured example, a horizontal area near the center of the die (shown in FIG. 6) is used for configuration, clock, and other control logic. Vertical columns 609 extending from this horizontal area or column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, processor block 610 spans several columns of CLBs and BRAMs. The processor block 610 can various components ranging from a single microprocessor to a complete programmable processing system of microprocessor(s), memory controllers, peripherals, and the like.

Note that FIG. 6 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 6 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In an example, one or more of the MGTs 601 can include a CDR system 650 for clock recovery. The CDR system 650 can be similar to the CDR system 300 shown in FIG. 3, or the CDR system 400 shown in FIG. 4.

While the foregoing is directed to specific examples, other and further examples may be devised without departing from the basic scope thereof, and the scope thereof is determined by the claims that follow.

What is claimed is:

1. An apparatus for clock data recovery (CDR), comprising:
 a data slicer operable to generate data samples derived from a transmitted signal;
 an error slicer operable to generate error samples derived from the transmitted signal;
 a CDR circuit operable to generate a common sampling clock phase for both the data slicer and the error slicer from output of the data samples and the error samples; and
 a decision adapt circuit operable to set a decision threshold of the error slicer, wherein for each main-cursor data sample of the data samples the decision adapt circuit is operable to adjust the decision threshold based on a sum of at least one term, each of the at least one term being a product of a scalar and one of a pre-cursor data sample or a post-cursor data sample.

2. The apparatus of claim 1, wherein the data slicer is operable to generate the data samples from output of a decision feedback equalizer (DFE), wherein the error slicer is operable to generate the error samples from the output of the DFE, and wherein the CDR circuit implements a minimum mean squared error (MMSE) algorithm to generate the sampling clock phase.

3. The apparatus of claim 1, wherein the data slicer is operable to generate the data samples from output of a DFE, wherein the error slicer is operable to generate the error samples from input to the DFE, and wherein the CDR circuit implements a Mueller-Muller algorithm to generate the sampling clock phase.

4. The apparatus of claim 1, wherein the decision adapt circuit computes the decision threshold according to $â_k*h_0+f(â_{k-1},â_{k+1})$, where $â_k$ is the main-cursor data sample, $h_0$ is an ideal amplitude scale of the main-cursor data sample, $â_{k-1}$ is the post-cursor data sample, $â_{k+1}$ is the pre-cursor data sample, and $f$ is the sum of the at least one term.

5. The apparatus of claim 4, wherein the sum of the at least one term comprises a term $s*(â_{k-1})*h_0$ or a term $s*(â_{k+1})*h_0$, where s is the scalar for the term.

6. The apparatus of claim 5, wherein the sum of the at least one term comprises a sum of a plurality of terms, $\Sigma_{i\neq 0} w_i*â_{k-i}$, where $w_i$ is the scalar for each of the plurality of terms.

7. A receiver, comprising:
a front end operable to receive from a transmitted signal from a channel;
a data slicer operable to generate data samples from output of the front end;
an error slicer operable to generate error samples from the output of the front end;
a clock data recovery (CDR) circuit operable to generate a common sampling clock phase for both the data slicer and the error slicer from output of the data samples and the error samples; and
a decision adapt circuit operable to set a decision threshold of the error slicer, wherein for each main-cursor data sample of the data samples the decision adapt circuit is operable to adjust the decision threshold based on a sum of at least one term, each of the at least one term being a product of a scalar and one of a pre-cursor data sample or a post-cursor data sample.

8. The receiver of claim 7, wherein the front end comprises a decision feedback equalizer (DFE).

9. The receiver of claim 8, wherein the data slicer is operable to generate the data samples from output of the DFE, wherein the error slicer is operable to generate the error samples from the output of the DFE, and wherein the CDR circuit implements a minimum mean squared error (MMSE) algorithm to generate the sampling clock phase.

10. The receiver of claim 8, wherein the data slicer is operable to generate the data samples from output of the DFE, wherein the error slicer is operable to generate the error samples from input to the DFE, and wherein the CDR circuit implements a Mueller-Muller algorithm to generate the sampling clock phase.

11. The receiver of claim 7, wherein the decision adapt circuit computes the decision threshold according to $â_k*h_0+f(â_{k-1},â_{k+1})$, where $â_k$ is the main-cursor data sample, $h_0$ is an ideal amplitude scale of the main-cursor data sample, $â_{k-1}$ is the post-cursor data sample, $â_{k+1}$ is the pre-cursor data sample, and $f$ is the sum of the at least one term.

12. The receiver of claim 11, wherein the sum of the at least one term comprises a term $s*(â_{k-1})*h_0$ or a term $s*(â_{k+1})*h_0$, where s is the scalar for the term.

13. The receiver of claim 12, wherein the sum of the at least one term comprises a sum of a plurality of terms, $\Sigma_{i\neq 0} w_i*â_{k-i}$, where $w_i$ is the scalar for each of the plurality of terms.

14. A method of clock data recovery (CDR) for a receiver, comprising:
generating, at a baud-rate, data samples derived from a received signal using a data slicer;
generating, at a baud-rate, error samples derived from the received signal using an error slicer;
generating a common sampling clock phase for both the data slicer and the error slicer from the data samples and the error samples; and
setting a decision threshold of the error slicer for each main-cursor data sample of the data samples by adjusting the decision threshold based on a sum of at least one term, each of the at least one term being a product of a scalar and one of a pre-cursor data sample or a post-cursor data sample.

15. The method of claim 14, wherein the data samples are generated from output of a decision feedback equalizer (DFE), wherein the error samples are generated from the output of the DFE, and wherein the sampling clock phase set using a minimum mean squared error (MMSE) algorithm.

16. The method of claim 14, wherein the data samples are generated from output of a decision feedback equalizer (DFE), wherein the error samples are generated from input to the DFE, and wherein the sampling clock phase is set using a Mueller-Muller algorithm.

17. The method of claim 14, wherein the decision threshold is set according to $â_k*h_0+f(â_{k-1},â_{k+1})$, where $â_k$ is the main-cursor data sample, $h_0$ is an ideal amplitude scale of the main-cursor data sample, $â_{k-1}$ is the post-cursor data sample, $â_{k+1}$ is the pre-cursor data sample, and $f$ is the sum of the at least one term.

* * * * *